(No Model.) 2 Sheets—Sheet 1.
E. H. ISRAEL.
BRACKET FOR SUPPORTING TANK PIPES.
No. 553,161. Patented Jan. 14, 1896.
Fig. I.
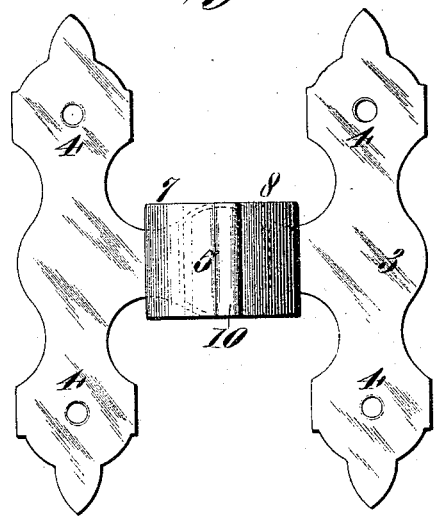
Fig. II.
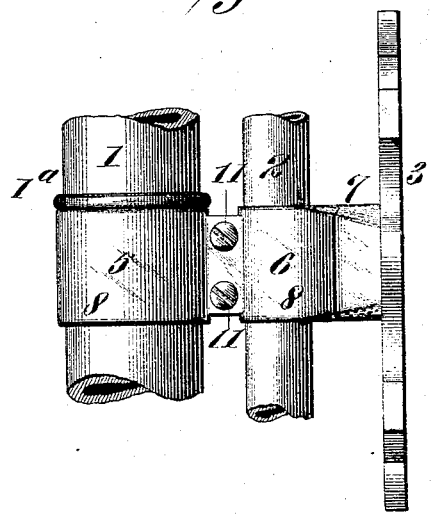
Fig. III.
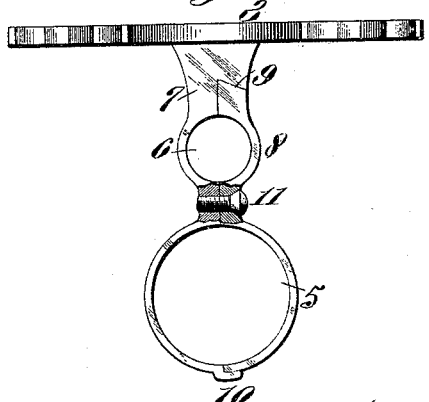
Fig. IV.
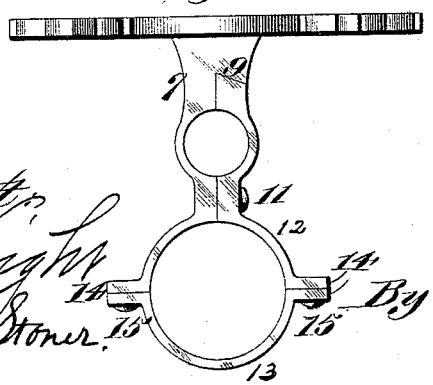
Attest:
E. S. Knight
Stanley Stoner
Inventor
Earl H. Israel.
By Knight & Bro.
Att'ys.
ANDREW B GRAHAM. PHOTO-LITHO. WASHINGTON. D.C.

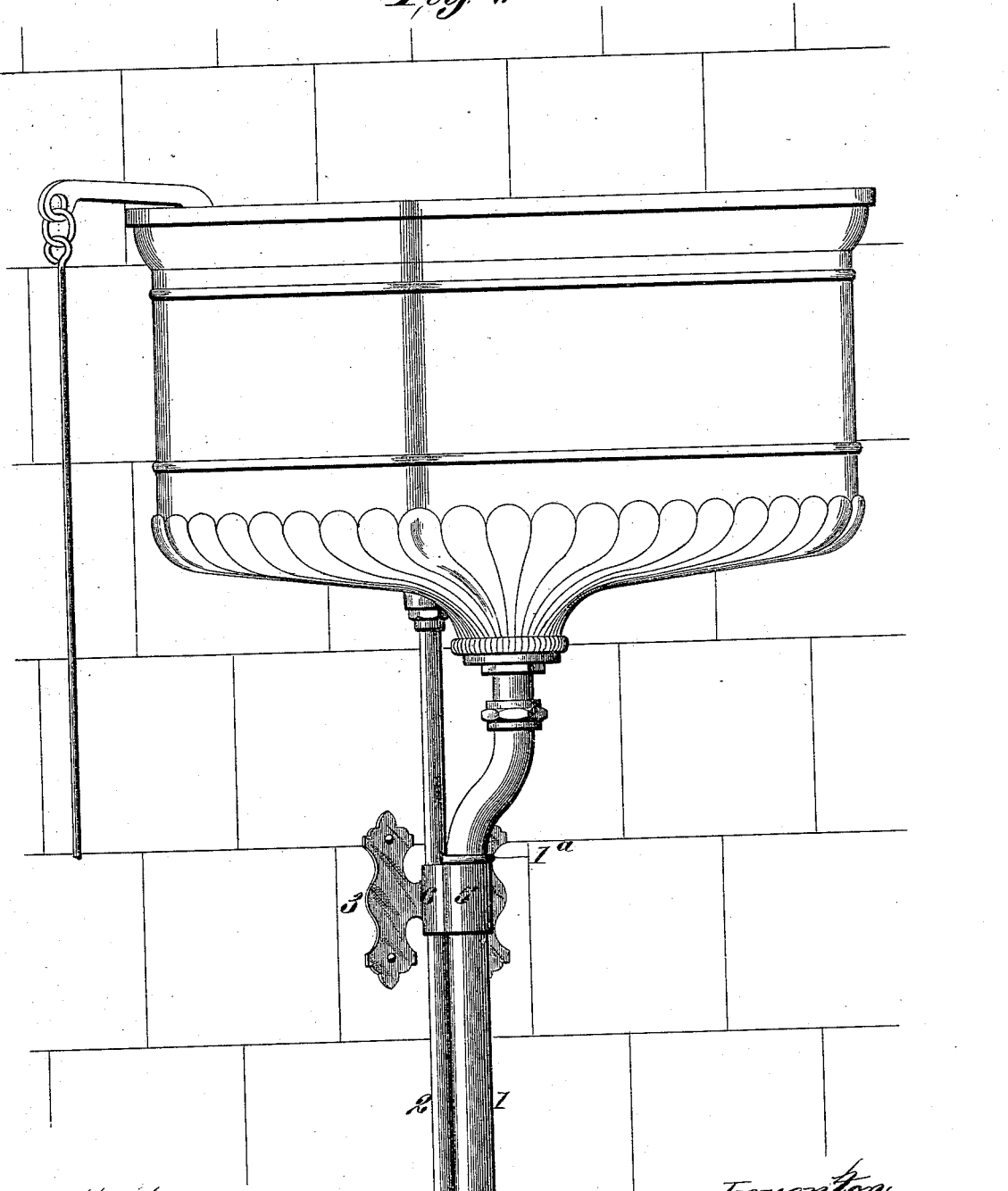

UNITED STATES PATENT OFFICE.

EARL H. ISRAEL, OF ST. LOUIS, MISSOURI, ASSIGNOR TO THE L. M. RUMSEY MANUFACTURING COMPANY, OF SAME PLACE.

BRACKET FOR SUPPORTING TANK-PIPES.

SPECIFICATION forming part of Letters Patent No. 553,161, dated January 14, 1896.

Application filed July 2, 1895. Serial No. 554,758. (No model.)

*To all whom it may concern:*

Be it known that I, EARL H. ISRAEL, a citizen of the United States, and a resident of the city of St. Louis, in the State of Missouri, have invented a certain new and useful Improvement in Brackets for Supporting Tank-Pipes, of which the following is a full, clear, and exact description, reference being had to the accompanying drawings, forming part of this specification.

My invention relates to an improved form of bracket for supporting the pipes and indirectly the tanks of water-closets, &c., whereby the pipes leading to the tank and the latter may be removed without disconnecting the bracket from its support.

My invention consists in features of novelty hereinafter fully described and pointed out in the claims.

Figure I is a front elevation of my improved bracket. Fig. II is a side view. Fig. III is a top or plan view. Fig. IV is a top view showing a modification. Fig. V is an elevation showing the application of my improved bracket.

Referring to the drawings, 1 represents part of the discharge-pipe of a tank, and 2 the supply-pipe.

3 represents the wall part of the bracket provided with holes 4 to receive screws or bolts by which the bracket is secured to the wall or other support.

The bracket has a collar or ring 5 for receiving the pipe 1 and a collar or ring 6 for receiving the pipe 2. On the pipe 1, just above the collar 5, is a bead $1^a$, that prevents downward movement of the pipe under the weight of the tank. One half of these collars is formed in an arm 7 of the wall-plate 3 and the other half 8 of the collars is removably connected to the arm 7, and my preferred manner of forming this connection is illustrated in Fig. III, the inner end of the part 8 having an inclined or dovetail-like joint 9 with the arm 7 and the outer end of the part 8 fitting behind a flange 10 on the outer end of the arm 7, and the parts 7 and 8 being joined between the collars 5 and 6 by means of a screw or screws 11. The part 8 is connected to the part 7 by slipping it vertically into place and then by applying the screw 11, the form of the joints at 9 and 10 acting with the screw 11 to hold the parts together, and thus a firm support for the pipes is provided.

In Fig. IV I have shown a form of construction wherein instead of employing the joint 10 I form the socket 5 in two parts 12 and 13, each provided with lugs or ears 14 connected by screws 15. With this construction the pipe confined by the outer socket 5 may be released by removing the screws 15 without releasing the pipe confined by the inner socket, or both pipes may be released by removing the screws 11 and 15.

I claim as my invention—

1. A bracket comprising a wall-plate, and a sectional collar one member of said collar being formed upon or secured to the wall-plate, and having half sockets and an incline adjacent to the wall-plate, and the other member of the collar having half sockets, an incline at its inner end by which it is united to the first mentioned member, and a fastening at its central part; substantially as described.

2. A bracket comprising a wall-plate and a sectional collar; one member of said collar being formed upon or secured to the wall-plate and having half sockets, an incline adjacent to the wall-plate, and a part adapted to overlap the outer end of the other member, the latter having half sockets, an incline at its inner end by which it is united to the first mentioned member, and a fastening at its central part; substantially as described.

EARL H. ISRAEL.

In presence of—
GEO. H. KNIGHT,
E. S. KNIGHT.